US012797809B2

(12) United States Patent
Baudtler et al.

(10) Patent No.: US 12,797,809 B2
(45) Date of Patent: Nov. 17, 2026

(54) CARBONATOR METAL NOZZLE

(71) Applicant: AARKE AB, Stockholm (SE)

(72) Inventors: Rasmus Baudtler, Stockholm (SE); Erik Wahlin, Värmdö (SE)

(73) Assignee: Aarke AB, Stockholm (SE)

( * ) Notice: Subject to any disclaimer, the term of this patent is extended or adjusted under 35 U.S.C. 154(b) by 898 days.

(21) Appl. No.: 18/247,396

(22) PCT Filed: Oct. 1, 2021

(86) PCT No.: PCT/SE2021/050969
§ 371 (c)(1),
(2) Date: Mar. 30, 2023

(87) PCT Pub. No.: WO2022/071870
PCT Pub. Date: Apr. 7, 2022

(65) Prior Publication Data
US 2024/0001312 A1 Jan. 4, 2024

(30) Foreign Application Priority Data
Oct. 1, 2020 (SE) .................................... 2051144-0

(51) Int. Cl.
*B01F 23/2361* (2022.01)
*B01F 23/231* (2022.01)

(52) U.S. Cl.
CPC .... *B01F 23/2361* (2022.01); *B01F 23/23121* (2022.01); *B01F 23/231265* (2022.01)

(58) Field of Classification Search
CPC ............ B01F 23/2361; B01F 23/23121; B01F 23/231265; B01F 23/2362;
(Continued)

(56) References Cited

U.S. PATENT DOCUMENTS 4,298,551 A * 11/1981 Adolfsson ............. F16K 15/144 137/859
4,399,081 A * 8/1983 Mabb .................. B01F 23/2361 261/DIG. 7
(Continued)

FOREIGN PATENT DOCUMENTS

CN 204232917 U 4/2015
CN 204969285 U 1/2016
(Continued)

OTHER PUBLICATIONS

Office Action, for Swedish Patent Application No. 2350698-3, dated Dec. 18, 2025.
(Continued)

*Primary Examiner* — David J Walczak
(74) *Attorney, Agent, or Firm* — Knobbe, Martens, Olson & Bear, LLP

(57) ABSTRACT

A carbonator dissolver nozzle for introducing CO2-gas into a beverage with a carbonator. The nozzle is adapted to protrude downward from the carbonator and into a beverage bottle that may be fastened to the carbonator. The nozzle comprises an upstream end that is adapted to be attached to the carbonator, a downstream end that is adapted to be immersed in the beverage within the bottle, and a conduit leading though the nozzle from the upstream end to the downstream end. At least the portion of the nozzle that is immersed in the beverage during use is entirely made of metal, or said portion consists of parts entirely made of metal with non-metal sealing material between said parts, wherein said portion has an outer surface of metal. A method of manufacture of a carbonator dissolver nozzle is also described.

13 Claims, 3 Drawing Sheets

(58) Field of Classification Search
CPC ............ B01F 23/237621; B01F 23/236; B01F 23/23126; B67D 1/0072; B05B 1/005; B05B 1/02; A23L 2/52; A23L 2/54
USPC ...................... 222/566, 567, 568; 261/76, 77
See application file for complete search history.

(56) References Cited

U.S. PATENT DOCUMENTS

| | | | | |
|---|---|---|---|---|
| 4,636,337 | A | 1/1987 | Gupta et al. | |
| 4,957,225 | A * | 9/1990 | Childers | B05C 17/00596 425/458 |
| 4,976,894 | A | 12/1990 | Robinson | |
| 5,458,165 | A | 10/1995 | Liebmann, Jr. | |
| 2016/0088973 | A1 | 3/2016 | Danieli et al. | |
| 2019/0291063 | A1 | 9/2019 | Gao | |
| 2020/0269198 | A1 | 8/2020 | Stevenson et al. | |

FOREIGN PATENT DOCUMENTS

| | | | |
|---|---|---|---|
| CN | 105696012 | A | 6/2016 |
| CN | 110664252 | A | 1/2020 |
| CN | 110985882 | A | 4/2020 |
| EP | 0073099 | A1 | 3/1983 |
| EP | 0245664 | A2 | 11/1987 |
| EP | 2279786 | A2 | 2/2011 |
| GB | 498536 | A | 1/1939 |
| JP | H 07278617 | A | 10/1995 |
| KR | 100971491 | B1 | 7/2010 |
| KR | 20150076986 | A | 7/2015 |
| TW | M 591319 | U | 3/2020 |
| WO | WO 00/07706 | A1 | 2/2000 |
| WO | WO 2012/162762 | A1 | 12/2012 |
| WO | WO 2015/021498 | A1 | 2/2015 |
| WO | WO 2018/081868 | A1 | 5/2018 |

OTHER PUBLICATIONS

Communication of a notice of opposition for EP Application No. 21798472.3 dated Jan. 16, 2025.

Screenshot Google Books: Chris Boulton:“Encyclopedia of brewing”, 2013, “Sparkler”, found on the internet: URL:https://books.google.de/books?id=fctJL-wKUzX4C&newbks=1&new-bks redir=0&lpg=PA1&hl=de&pg=PT623#v=onepage&q&f=false [found on Nov. 18, 2024].

Screenshot Google Books: J.R. Davis: “Stainless Steel”, 1994, p. 169, found on the internet: URL:https://www.google.de/books/edition/Stain-less Steels/OrIG98AHdoAC?hl=en&gbpv=1&dq=Stain-less%20Steel%20J.R.%20Davis&pg=PA169&printsec=frontcover [found on Nov. 18, 2024].

Screenshot Google Books: Alexandru Grumezescu, Alina Maria Holban. “Engineering Tools in the Beverage Industry vol. 3: The Science of Beverages.” Feb. 8, 2019, p. 6, found on the internet: URL:https://books.google.de/books?id=fctJLwKUzX4C&newbks=1&new-bksredir=0&lpg=PA1&hl=de&pg=PT623#v=onepage&q&f=false [found on Nov. 18, 2024].

Water Industry Information & Guidance Note: Applications for Stainless Steel in the Water Industry, Jan. 1999.

International Search Report for International Application No. PCT/SE2021/050969 dated Jan. 17, 2022.

Swedish Search Report for Patent Application No. 2350698-3 dated Mar. 1, 2024.

* cited by examiner

CARBONATOR METAL NOZZLE

CROSS REFERENCE TO RELATED APPLICATION

This application is a U.S. National Phase Application of PCT International Application Number PCT/SE2021/050969, filed on Oct. 1, 2021, designating the United States of America and published in the English language, which claims priority to Sweden Provisional Application No. 2051144-0, filed on Oct. 1, 2020, each of which is hereby expressly incorporated by reference in its entirety for all purposes and forms a part of this specification.

TECHNICAL FIELD

The present disclosure generally pertains to carbonators for carbonating beverages, and more particularly to a carbonator dissolver nozzle, and to a method of manufacture of such a nozzle.

BACKGROUND ART

Carbonators are used for producing carbonated beverage, such as carbonated water. Carbonators for domestic use are typically designed to be placed free-standing on a table or kitchen countertop and are operated manually by a person. Such a carbonator, a.k.a. a soda water machine, typically comprises a carbon dioxide cylinder that is connected to a plastic nozzle that is inserted into a beverage bottle that contains liquid. The carbonator further comprises an operating arrangement that allows the user to open a valve in the carbon dioxide cylinder to introduce carbon dioxide into the beverage bottle. The carbon dioxide dissolves in the liquid in the beverage bottle.

SUMMARY OF THE INVENTION

One object of the present disclosure is to provide a dissolver nozzle for a carbonator of the above-mentioned type that is sturdy, has a long life and avoids or minimises beverage contact with plastic material as a result of the beverage being carbonated. Further, the dissolver nozzle shall be easy to manufacture and minimise icing within the nozzle during introduction of the carbon dioxide into the beverage bottle.

Such a carbonator dissolver nozzle is according to the present disclosure provided in form of a carbonator dissolver nozzle for introducing $CO_2$-gas into a beverage by means of a carbonator, wherein the nozzle is adapted to protrude downward from the carbonator and into a beverage bottle that may be fastened to the carbonator, the nozzle comprising an upstream end that is adapted to be attached to the carbonator, a downstream end that is adapted to be immersed in the beverage within the bottle, and a conduit leading though the nozzle from the upstream end to the downstream end. At least the portion of the nozzle that is immersed in the beverage during use is entirely made of metal, or the portion consists of parts entirely made of metal with non-metal sealing material between said parts, wherein at least the portion of the nozzle that is immersed in the beverage during use has an outer surface of metal. Further, the area of the conduit is reduced in steps and comprises a main conduit section, and outlet taper section and an ultimate conduit section.

Since the portion of the nozzle that is in contact with the beverage has an outer surface of metal, the beverage will not be in contact with any other material, such as plastic, as a result of being carbonated. Metal may in some aspects be more hygienic than plastic, especially after long time use of the nozzle. Metal may be provided with a fine surface finish and be more resistant to scratching and fatigue than other materials, such as plastic. Further, a nozzle at least partly made of metal may have a high strength.

The present nozzle is advantageously used when carbonating beverage in a non-plastic bottle, such as a glass bottle, whereby the beverage may be enclosed and carbonated avoiding contact with plastic material.

The part of the nozzle that forms the $CO_2$-gas outlet may advantageously be made of metal. In this way, the outlet may retain its shape and dimensions even after repeated use possibly including being subject to impacts during handling. A metal outlet may also more easily be reshaped and optimised during a design process, e.g. by machining, as compared to an outlet of plastic material. Furthermore, metal may reduce the icing of the nozzle, which may result from the pressure of the $CO_2$-gas being reduced near the outlet of the nozzle. Also, the stepwise conduit area reduction may result in a less turbulent gas flow which may reduce the icing.

The load bearing parts of the nozzle may be entirely made of metal, the nozzle in addition possibly including non-metal sealing means that are not load bearing. The nozzle may consist of parts entirely made of metal with non-metal sealing material arranged between said metal parts.

Preferably, at least the portion of the nozzle that is immersed in the beverage during use is entirely made of metal. In this way, not even beverage entering into the nozzle during the carbonation process will contact any other material than metal. The lower half of the nozzle may be made of metal. Preferably, the nozzle is entirely made of metal.

Preferably, the metal used in the nozzle, either to form an outer component, a $CO_2$-gas outlet, a load bearing component, or the entire nozzle is food grade metal. Such metals include stainless steel such as SUS304, aluminium such as 3003, 3004 or 5052 or brass such as OT57. Aluminium appear beneficial as it may help reduce icing.

For reasons of easy of manufacture, the area of the conduit is reduced in steps. The conduit comprises a main conduit section, and outlet taper section and an ultimate conduit section. The latter forming the nozzle outlet. Such a conduit may be formed by drilling.

Preferably, the conduit tapers at an angle of 100 degrees or less to form the ultimate conduit section. The outlet taper section thus tapers at an angle of 100 degrees or less. The outlet taper section preferably tapers at an angle of 45 to 90 degrees, most preferably approximately 60 degrees. Brass may form a preferred material for the part of the nozzle that forms the outlet taper section, as brass allows drilling with a small taper angle such as approximately 60 degrees.

Preferably, the ultimate conduit section has a length that does not exceed 1 mm. More preferably, the length of the ultimate conduit section does not exceed 0.5 mm. Preferably, the diameter of the ultimate conduit section does not exceed 1 mm, or 0.5 mm. One advantageous ultimate conduit section has a length of approximately 0.5 mm and a diameter of approximately 0.5 mm.

The conduit preferably comprises a main conduit section and an ultimate conduit section, the main conduit section having an area that is 10 to 50 times the area of the ultimate conduit section. Such a nozzle may be relatively easy to manufacture by drilling. Preferably, the main conduit section extends through at least 80% of the length of the nozzle.

Typically, the ultimate conduit section extends through approximately 1% of the length of the nozzle.

Preferably, the nozzle is one-piece. Such a nozzle may be particularly sturdy, easy to handle, and does not require any assembly.

The nozzle may comprise two metal pieces that are adapted to be attached to one another. In this way, one of the metal pieces may form the nozzle outlet that requires high precision manufacture. The metal piece that forms the nozzle outlet may be given a shape that is suitable for high precision manufacture, such as a shape with outer dimensions that correspond each other in size. For example, a cylinder with a height that corresponds to its diameter, e.g. where the height is no longer than three times the diameter.

Preferably, the two metal pieces are a main body part and an outlet part, wherein an ultimate, most downstream, conduit section is formed in the outlet part. The outlet part preferably has a shape with relative dimensions that render the outlet part is suitable for high precision manufacture, as was described in the preceding paragraph.

Preferably, the main body part and the outlet part are adapted to be screwed together, which provides an easy assembly.

The main body part and/or the outlet part may comprise holding means for holding an elastically deformable retaining member, such that the elastically deformable retaining member is deformed upon attaching or assembling the main body part and an outlet part together. The elastically deformable retaining member may retain the main body part and the outlet part together. The holding means may comprise a groove, or may for additional sealing and better retaining comprise two grooves at an axial distance from each other.

The elastically deformable retaining member may be an annular sealing, such as an O-ring.

The present disclosure further provides a method of manufacture of a carbonator dissolver nozzle for a carbonator. The method comprising the steps of drilling a main conduit section through at least 80% of the length of the nozzle, and drilling an ultimate conduit section, wherein the main conduit section has a diameter that is at least four times the diameter of the ultimate conduit section.

The main conduit section may be drilled from the inlet end of the carbonator dissolver nozzle and the ultimate conduit section may be drilled from the outlet end of the carbonator dissolver nozzle. In other words, the main conduit section may be drilled in the flow direction through the nozzle whereas the ultimate conduit section is drilled in the opposite direction, i.e. against the flow direction through the nozzle.

Alternatively, the main conduit portion and the ultimate conduit section may be drilled in the same direction, more precisely in the flow direction through the nozzle.

The method may comprise a first step of providing a carbonator dissolver nozzle precursor, which is subsequently subject to the drilling. The precursor is preferably made of metal.

BRIEF DESCRIPTION OF THE DRAWINGS

The present invention will be described further below by way of examples and with reference to the enclosed drawings, in which.

DETAILED DESCRIPTION OF EMBODIMENTS

The disclosed embodiments will now be described more fully hereinafter with reference to the accompanying drawings. Like numbers refer to like elements throughout the description of the embodiments and the drawings.

FIG. 1 shows a carbonator dissolver nozzle 1, hereinafter nozzle 1, for use with a carbonator 10 of the type shown in FIG. 1*d* or a similar soda water machine. The nozzle 1, as is shown in FIG. 1*d*, protrudes downward from a carbonator head 11 of the carbonator 10 to which a beverage bottle (not shown) is to be fastened. When a bottle is fastened to the carbonator head 11, the nozzle protrudes downward into the bottle to a position where the nozzle is immersed in the beverage, typically water, within the bottle.

The nozzle 1 of the first embodiment (FIGS. 1*a* and 1*b*) comprises an upstream end, which may also be referred to as the upper end or the inlet end, which is attached to the carbonator 10 by of suitable mechanical fitting means. In the present disclosure, the upper end of the nozzle 1 comprises outer threads whereas the carbonator 10, more precisely the carbonator head 11, comprises cooperating inner threads (not shown).

The upper end of the present nozzle 1, below the treads, further comprises two radially opposing flat surfaces such that the nozzle 1 may be gripped and screwed by means of a tool, e.g. a wrench or a spanner. In alternative, the upper end of the nozzle 1 may comprise a polygonal area, or a radial blind hole, allowing the nozzle to be screwed into the carbonator 10 by a suitable tool.

Figure 1A:
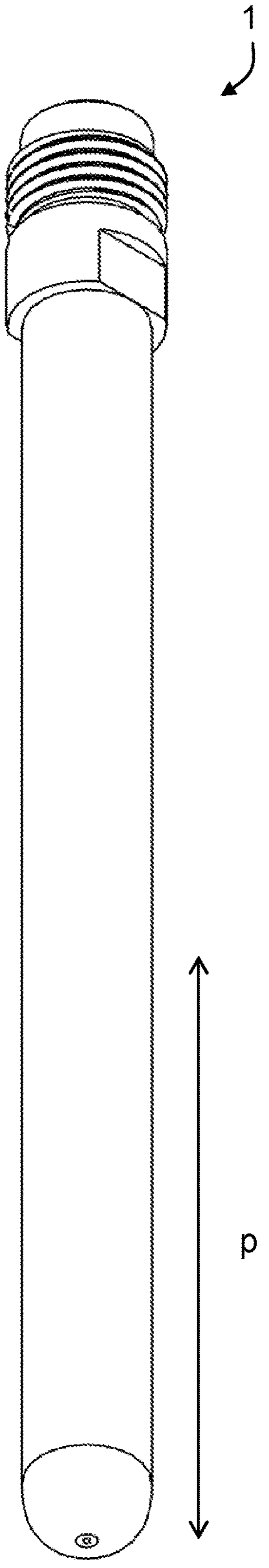
FIG. 1*a* is a perspective view of a one-piece carbonator dissolver nozzle 1 according to a first embodiment.
Figure 1B:
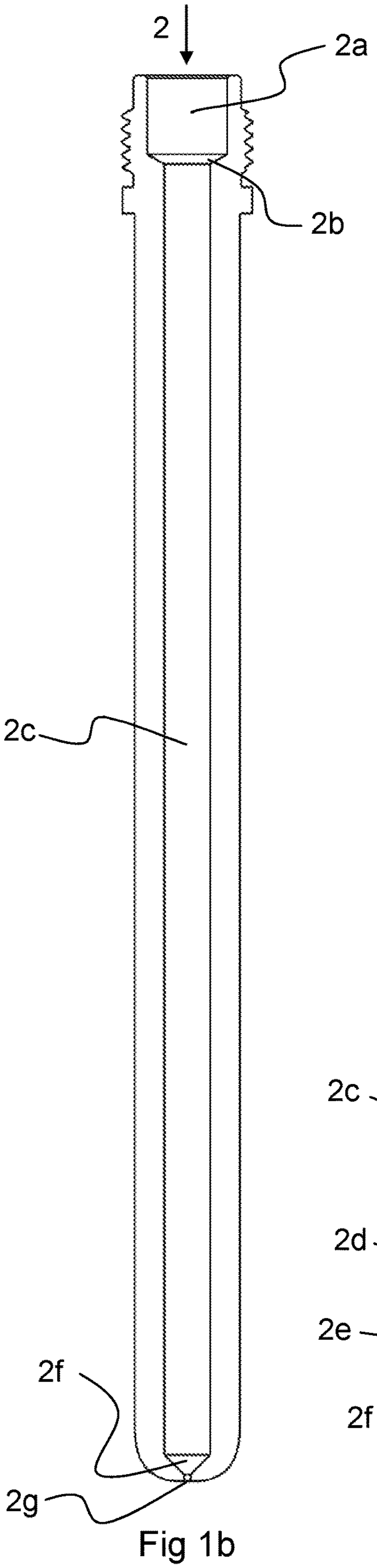
FIG. 1*b* is a cross sectional side view corresponding to FIG. 1*a*.
Figure 1D:
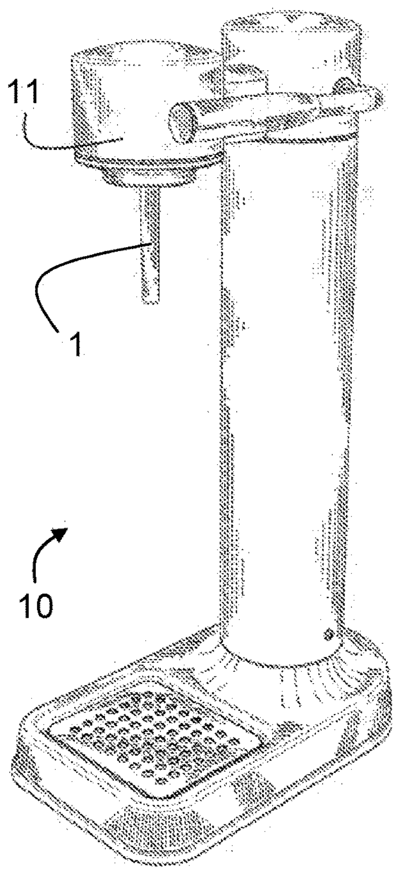
FIG. 1*d* shows an exemplary domestic free-standing carbonator 10, or soda water machine, with a carbonator dissolver nozzle 1 according to the present disclosure.

As is shown in FIG. 1*b*, a conduit 2 is formed through the nozzle 1 from the upper end to the lower end thereof. The nozzle is thus tubular. The conduit may also be referred to as a gas conduit and provides $CO_2$ from the carbonator 10 to the beverage contained in the beverage bottle when the carbonator 10 is used. In the embodiments of this disclosure, the nozzle 1 has a circular outer cross section. In the embodiments of this disclosure, the outer form of the nozzle 1 is a straight rod, apart from the upper end where the threads and the flat surfaces are located.

The nozzle has an elongated shape with a length that is approximately eight to ten times its outer diameter. The downstream end of the nozzle, which may also be referred to as the lower end or the outlet end, is rounded so as to not damage e.g. the beverage bottle to be used with the carbonator 10, or the hand of a user. The outlet end comprises a central outlet opening through which $CO_2$ gas is ejected when the carbonator 10 is used. The outlet opening is formed by the most downstream section 2*g* of the conduit as explained below and illustrated in the figures.

Depending of the amount of water filled into the bottle, roughly half the nozzle 1 is immersed in water when the carbonator 10 is used. In FIG. 1*a*, the portion p of the nozzle 1 that is typically immersed in water during use is indicated by a double-ended arrow denoted p.

The conduit 2 comprises a most upstream section 2*a* that forms a nozzle inlet and a most downstream section 2*g* that forms a nozzle outlet. Via a first frustoconical taper section 2*b*, the most upstream section 2*a* converges into a main conduit section 2*c*, or main section 2*c*. The main section 2*c* forms the chief part of the conduit 2 length. In the embodiment of FIGS. 1*a* and 1*b*, the main section 2*c* forms approximately 90% of the conduit 2 length.

Figure 1C:
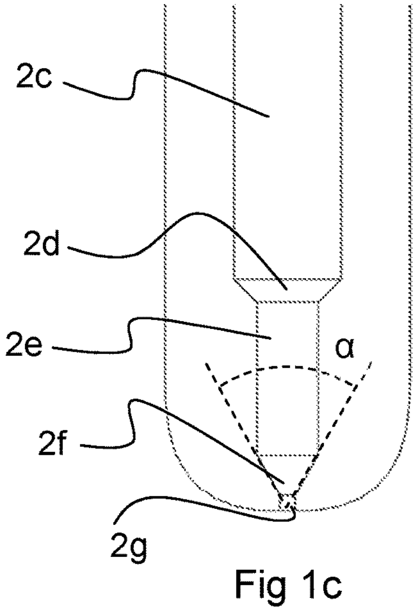
FIG. 1*c* is an enlarged section of a second embodiment of the downstream end of the dissolver nozzle of FIG. 1.

In the first embodiment, the main section 2*c* converges via an outlet taper section 2*f* into the most downstream section 2*g*. The outlet taper section 2*f* has a taper angle α (the angle α is indicated in FIG. 1*c* that discloses the second embodiment) of approximately 90 degrees. The taper angle α is defined as the angle formed between the opposing sidewalls of a frustoconical taper section. In another example (not shown), the outlet taper section of a nozzle 1 of the first embodiment may have an outlet taper angle α of approximately 60 degrees.

Thus, the conduit 2 of the first embodiment comprises a most upstream section 2*a*, an inlet taper section 2*b*, a main section 2*c*, an outlet taper section 2*f* and a most downstream section 2*g* fluidly connected in that order. The most upstream section 2*a*, the main section 2*c* and the most downstream section 2*g* are straight and of circular cross section and may be formed by drilling. The taper sections 2*b*, 2*f* are frustoconical and may be formed by drilling, more precisely by a conical drill tip.

The inlet taper section 2*b* has a taper angle that is larger than 90 degrees, approximately 120 degrees. When a nozzle 1 of the present disclosure is attached to a carbonator 10, there is a tubular carbonator head outlet (not shown) protruding into the most upstream section 2*a* to rest against the inlet taper section. An O-ring (not shown) of the carbonator 10 may be arranged between the carbonator head outlet and the inlet taper section 2*b*.

FIG. 1*c* illustrates a second embodiment of the nozzle 1, only showing the downstream end of the nozzle. The second embodiment differs from the first embodiment in that it comprises an intermediate taper section 2*d*, which is positioned between the inlet taper section 2*b* and the outlet taper section 2*f*. The second embodiment further comprises a step section 2*e* that connects the intermediate taper section 2*d* and outlet taper section 2*f*. The outlet taper section 2*f* of the second embodiment has a taper angle α of approximately degrees.

It is believed advantageous for the gas flow through the nozzle 1 to reduce the area of the conduit 2 in several steps to the final most downstream section 2*g* that forms a nozzle outlet. Such a stepwise area reduction may result in a less turbulent gas flow which appears to reduce the icing. A continuous area reduction may be difficult and/or costly to manufacture, when at least a portion of the conduit is formed in metal.

The conduit 2 of the second embodiment (FIG. 1*c*) comprises a most upstream section 2*a*, an inlet taper section 2*b*, a main section 2*c*, an intermediate taper section 2*d*, a step section 2*e*, an outlet taper section 2*f* and a most downstream section 2*g*. The most upstream section 2*a*, the main section 2*c*, the step section 2*e* and the most downstream section 2*g* are straight sections of circular cross section that may be formed by drilling. The taper sections 2*b*, 2*d*, 2*f* are frustoconical and may be formed by drilling.

The nozzles 1 of the first and second embodiments are one-piece metal nozzles 1.

FIGS. 2*a* to 2*d* illustrate a third embodiment of the nozzle 1. In this embodiment, the nozzle 1 consists of two metal pieces, in the form of a main body part and an outlet part, and a sealing 6*a*. More precisely, the nozzle of the third embodiment comprises a treaded main body part 3*a*, a threaded outlet part 4*a* and an O-ring 6*a*.

When the treaded main body part 3*a* and the threaded outlet part 4*a* are attached to one another by means of the threads, the resulting nozzle 1 has a very similar outer shape as the one of the first or second embodiments. The only visual difference being the joint between the treaded main body part 3*a* and the threaded outlet part 4*a*.

The treaded main body part 3*a* comprises a lower recess 7*a*, which is open in the downstream direction, into which the threaded outlet part 4*a* is screwed when the nozzle 1 is assembled. The lower recess 7*a* is cylindrical and comprises an inner thread, see FIG. 2*c*. The diameter of the lower recess 7*a* approximately equals the mean value of the diameters the main conduit section 2*c* and the outer diameter of the treaded main body part 3*a*. The main conduit section 2*c* of the third embodiment leads from the inlet taper section 2*b* to the lower recess 7*a*.

Figure 2A:
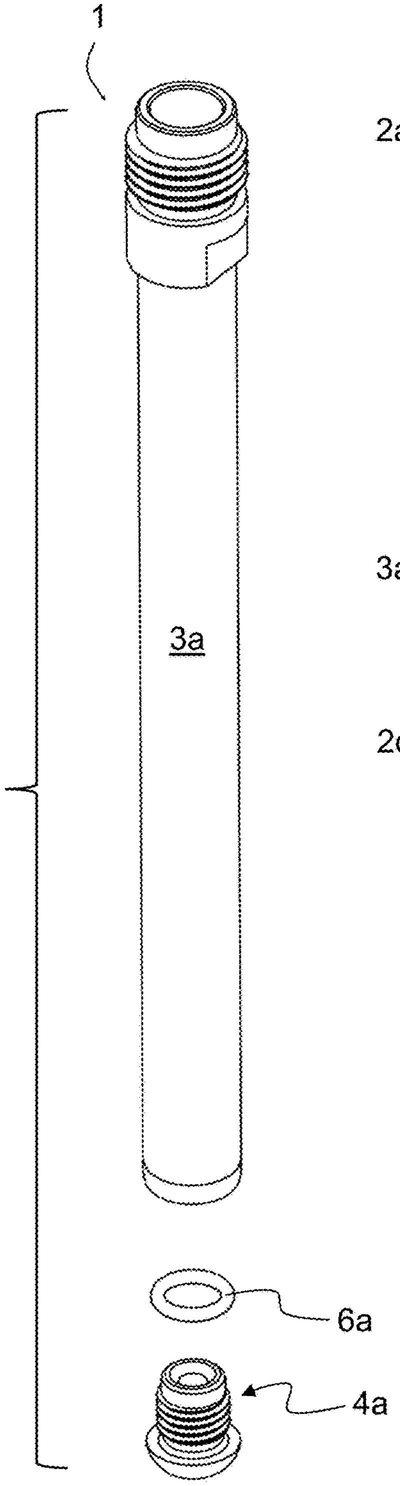
FIG. 2*a* is a perspective exploded view of a carbonator dissolver nozzle 1 according to ta a third embodiment, comprising a treaded main body part 3*a* and a threaded outlet part 4*a*.
Figure 2B:
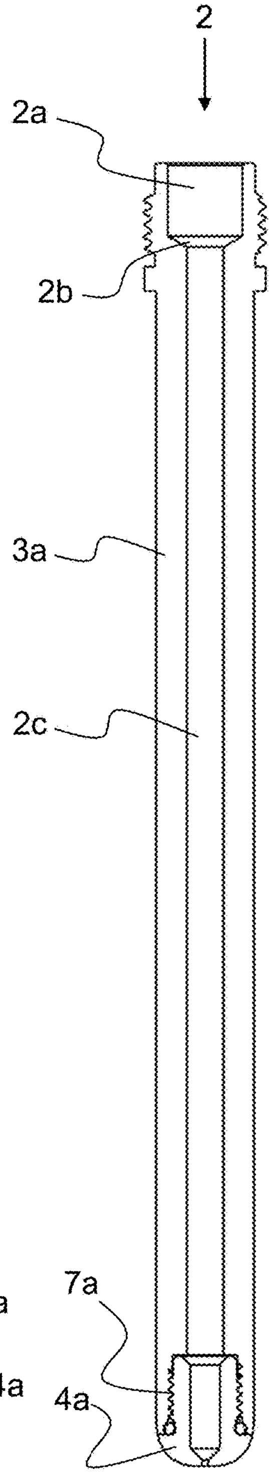
FIG. 2*b* is a cross sectional assembled side view corresponding to FIG. 2*a*.
Figure 2D:
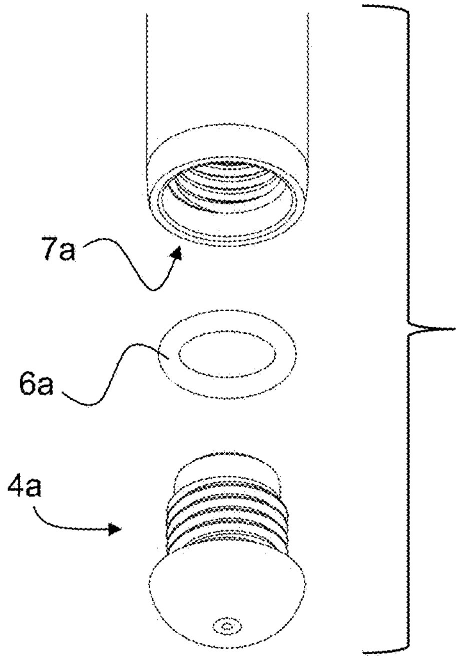
FIG. 2*d* is a perspective exploded view of the downstream end of the dissolver nozzle 1 of FIG. 2*b*.
Figure 2C:
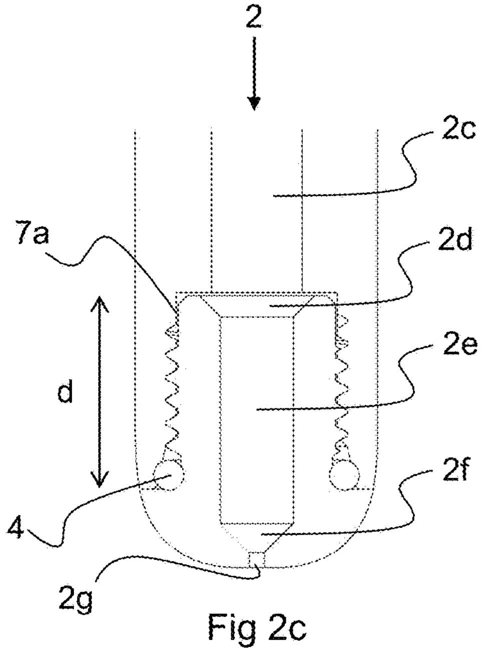
FIG. 2*c* is an enlarged section of the downstream end of the dissolver nozzle 1 of FIG. 2*b*.

Once the threaded outlet part 4*a* is screwed into the lower recess 7*a* of the treaded main body part 3*a*, the threaded outlet part 4*a* forms the intermediate taper section 2*d* that has been described above. The upper, or upstream, end of the threaded outlet part 4*a* now lies flush against the annular inner end surface of the lower recess, as is shown in FIG. 2*c*. The intermediate taper section 2*d* formed by the threaded outlet part 4*a* has an upstream diameter that exceeds the diameter of the main conduit section 2*c*, even though in another example (not shown) the upstream diameter may equal the diameter of the main conduit section 2*c*.

Once assembled, the threaded outlet part 4*a* forms the step section 2*e* that has been described above. The threaded outlet part 4*a* further forms the outlet taper section 2*f* and the most downstream section 2*g*. The outlet taper angle α of the third embodiment is approximately 90 degrees.

The threaded outlet part 4*a* is essentially cylindrical with an outer thread on the outside of the portion that forms the step section 2*e*. The downstream end of the threaded outlet part 4*a* has an outer diameter that equals the diameter of the main body part 3*a*. The downstream end of the threaded outlet part is rounded such that the nozzle of the third embodiment when assembled has the same outer form as the nozzle of the first or second embodiments.

FIGS. 3*a* to 3*d* illustrate a fourth embodiment of the nozzle 1. In this embodiment, as in the third embodiment, the nozzle 1 consists of a main body part and an outlet part in the form of two metal pieces. Said metal pieces are formed of a receiving main body part 3*b* and a grooved outlet part 4*b*. There are also two retaining sealings 6*b*

(O-rings) that not only seal the metal pieces 3*b*, 4*b* but also retain them in an assembled condition.

The receiving main body part 3*b* has an outer shape that is similar to the nozzle 1 of the first or second embodiments, apart from a lower circular opening 8 formed by an annular lip portion 9. The receiving main body part 3*b* of the fourth embodiment has a main conduit section 2*c* of approximately double the diameter as compared to the nozzles 1 of the earlier embodiments. The receiving main body part 3*b* of the fourth embodiment includes a lower void 7*b* into which the grooved outlet part 4*b* is inserted when the nozzle 1 is assembled. The grooved outlet part 4*b* extends into the lower circular opening 8 and forms the most downstream section 2*g* of the conduit 2, thus the outlet opening of the nozzle 1.

The diameter of the lower void 7*b* is smaller than the diameter of the main conduit section 2*c* of the fourth embodiment, even though in another example (not shown) the diameter of the lower void 7*b* may equal the diameter of the main conduit section 2*c*. The inner sidewall of the lower void 7*b* is smooth.

Figure 3A:
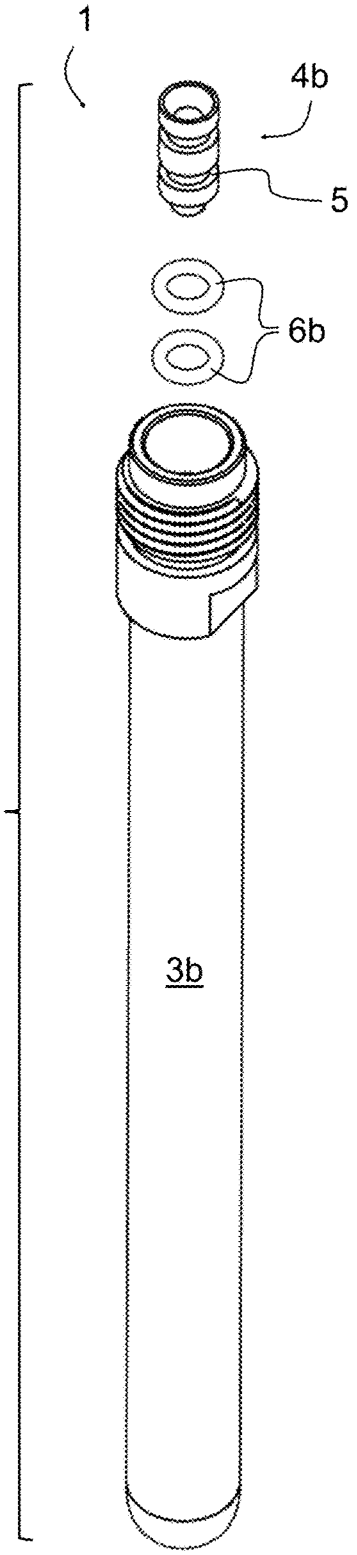
FIG. 3*a* is a perspective exploded view of a carbonator dissolver nozzle 1 according to ta a fourth embodiment, comprising a receiving main body part 3*b* and a grooved outlet part 4*b*.
Figure 3B:
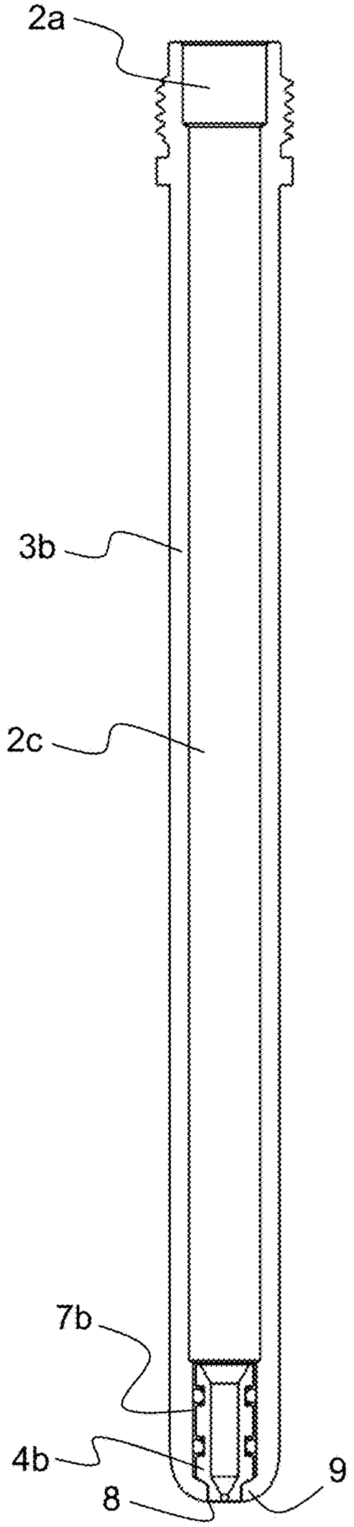
FIG. 3*b* is a cross sectional assembled side view corresponding to FIG. 3*a*.
Figure 3D:
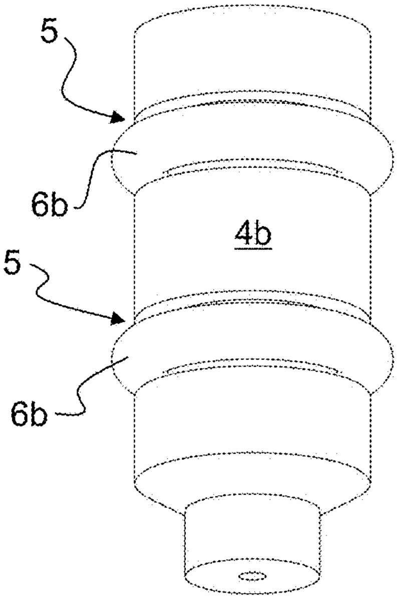
FIG. 3*d* is a perspective view of the outlet part 4*b* of FIGS. 3*a* to 3*c*.

The grooved outlet part 4*b* is of a generally cylindrical form, with an outer dimeter that is slightly smaller than the lower void. The outer circumference of the grooved outlet part 4*b* comprises at least one, in this example two grooves 5 as is illustrated in FIG. 3*d*. As an alternative, the grooves 5 may be formed in the inner wall of the lower void 7*b*. The grooves 5 and the retaining sealings 6*b* are mutually shaped such that the retaining sealings 6*b* fit in the grooves while protruding above the surface of the cylindrical form of the grooved outlet part 4*b*.

Upon assembly, the grooved outlet part 4*b* with the two retaining sealings 6*b* arranged in the grooves 5 is pushed into the main conduit section 2*c* of the receiving main body part 3*b* via the nozzle inlet (formed by the most upstream section 2*a*), though the main conduit section 2*c* and into the lower void 7*b*.

Figure 3C:
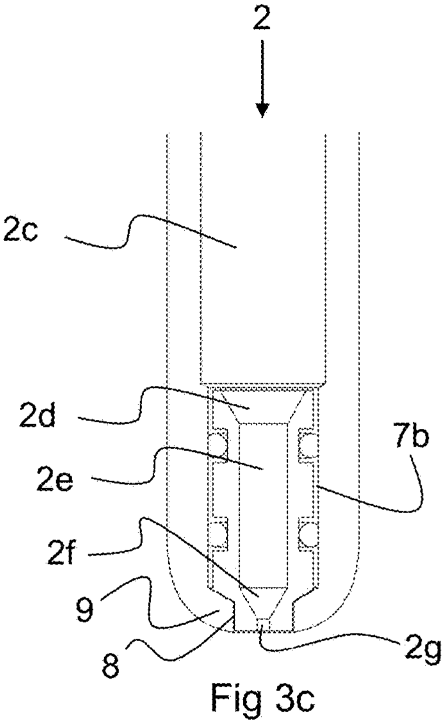
FIG. 3*c* is an enlarged section of the downstream end of the dissolver nozzle of FIG. 3*b*.

The grooved outlet part 4*b* may be pushed into the lower void 7*b* by means of a pin or a similar elongated object, until the grooved outlet part 4*b* reaches the lowermost position resting against the inner surface of the annular lip portion 9. In this position, a lower (downstream) protruding portion of the grooved outlet part 4*b* extends into the lower circular opening 8 of the grooved outlet part 4*b*. The most downstream section 2*g* is formed in the lower protruding portion of the grooved outlet part 4*b*. The outer diameter of the lower protruding portion and the inner diameter of the lower circular opening 8 are selected such that the lower protruding portion snugly fits in the lower circular opening 8, as is illustrated in FIG. 3*c*.

When the grooved outlet part 4*b* is pushed into the lower void 7*b*, the retaining sealings 6*b* are elastically deformed, or compressed, between the grooves 5 and the inner sidewall of the lower void 7*b*. As the retaining sealings 6*b* after assembly strive to return to their non-deformed form, they exert a radial expansive force between the grooved outlet part 4*b* and the lower void 7*b* and thus the grooved outlet part 4*b* is retained within the lower void 7*b*.

The elastic retaining sealings 6*b* have an inner diameter that is smaller than the outer diameter of the grooved outlet part 4*b* and are thus elastically held in the grooves 5. The grooves 5 provide a form fit for the retaining sealings 6*b*. Once the grooved outlet part 4*b* is fitted in the lower void 7*b*, the retaining sealings 6*b* hinder the grooved outlet part 4*b* from moving axially within the lower void 7*b* by frictional forces between the retaining sealings 6*b* and the inner wall of the lower void 7*b*.

In the third embodiment (FIGS. 2*a* to 2*d*) and the fourth embodiment (FIGS. 3*a* to 3*d*) the nozzle 1 comprises a separate metal piece or insert (the threaded outlet part 4*a* and the grooved outlet part 4*b*, respectively) that forms the ultimate conduit section 2*g*. As has been mentioned, the ultimate conduit section 2*g* forms the outlet opening of the nozzle 1. For this reason, it is desired to manufacture the ultimate conduit section 2*g* with high precision. It is believed that a straight ultimate conduit section 2*g* with a smooth inner surface forms a less turbulent $CO_2$ flow, thereby minimising any icing that may partially or fully block the conduit 2 near its outlet.

The outlet parts 4*a*, 4*b* both have a form that is advantageous for precision manufacture, as their length is approximately the same as their width. In the examples shown, the outlet part lengths are approximately 1.5 to 2 times the outlet part widths. As a comparison, the entire nozzle 1 has a length that is approximately eight to ten times its width and thus precision drilling (of the most downstream section 2*g*) there through requires specific tooling and skill.

If the conduit 2 through the nozzle 1 of the first or second embodiment is to be formed by drilling, the main section 2*c* may be drilled from the inlet end of the nozzle 1 and the most downstream section 2*g* may be drilled from the outlet end of the nozzle.

Alternatively, the larger main section 2*c* may be beneficial for precision drilling of the most downstream section 2*g* through the main section 2*c* as a drill with an enlarged shank can be used. The most downstream section 2*g* may thus be drilled in the direction of the gas ($CO_2$) flow through the main section 2*c*.

In the embodiments of this disclosure, the most downstream section 2*g* is a narrow gas passage. The most downstream section 2*g* has a diameter of less than 1 mm, preferably approximately 0.5 mm. The most downstream section 2*g* has a length (in the direction of gas flow or longitudinal direction of the nozzle 1) of less than 1 mm, preferably approximately 0.5 mm. Such dimensions of an outlet opening have proven suitable for a carbonator 9 of the type referred to above.

In order to reduce the icing, it appears that the relationship between dimensions of the outlet, i.e. the length and transverse area of the most downstream section 2*g*, and the penultimate straight conduit section (2*c* or 2*e*) is of importance. Also, the taper angle $\alpha$ of the outlet taper section 2*f* shall preferably be below 100 degrees. In the embodiments of the present disclosure, the transverse area of the respective penultimate straight conduit section is 10-50 times the transverse area of the most downstream section 2*g*. It appears that a lower ratio is advantageous. In the second, third and fourth embodiments the transverse area of the respective penultimate straight conduit section 2*e* is 10-20 times the transverse area of the most downstream section 2*g*. Also, it appears the length of the most downstream section 2*g* shall essentially equal its diameter.

The invention claimed is:

1. A carbonator for producing a carbonated beverage, the carbonator comprising:
- a carbonator head adapted to have a beverage bottle fastened thereto; and
- a carbonator dissolver nozzle for introducing $CO_2$-gas into a beverage, wherein the carbonator dissolver nozzle is adapted to protrude downward from the carbonator head and into the beverage bottle, the carbonator dissolver nozzle comprising:
  - an upstream end that is adapted to be attached to the carbonator head;

a downstream end that is adapted to be immersed in a beverage within the beverage bottle; and a conduit leading though the carbonator dissolver nozzle from the upstream end to the downstream end, wherein the carbonator dissolver nozzle comprises parts entirely made of metal with a non-metal sealing material between said parts, wherein at least a portion of the carbonator dissolver nozzle that is immersed in the beverage during use has an outer surface of metal, and wherein an area of the conduit is reduced in steps and comprises a main conduit section, an outlet taper section and an ultimate conduit section.

2. The carbonator of claim 1, wherein the parts entirely made of metal comprise load bearing parts.

3. The carbonator of claim 1, wherein the metal is food grade metal.

4. The carbonator of claim 1, wherein the metal is stainless steel, aluminium, or brass.

5. The carbonator of claim 1, wherein the outlet taper section tapers at an angle of 100 degrees or less to form the ultimate conduit section.

6. The carbonator of claim 1, wherein the ultimate conduit section has a diameter that does not exceed 1 mm and a length that does not exceed 1 mm.

7. The carbonator of claim 1, wherein the main conduit section extends through at least 80% of a length of the carbonator dissolver nozzle.

8. The carbonator of claim 1, wherein the area of the main conduit section is 10 to 50 times the area of the ultimate conduit section.

9. The carbonator of claim 1, wherein the carbonator dissolver nozzle comprises two metal pieces that are adapted to be attached to one another.

10. The carbonator of claim 9, wherein the two metal pieces comprise a main body part and an outlet part, and wherein the ultimate conduit section is formed in the outlet part.

11. The carbonator of claim 10, wherein the main body part and the outlet part are adapted to be screwed together.

12. The carbonator of claim 10, wherein the main body part and/or the outlet part comprises holding means for holding an elastically deformable retaining member such that the elastically deformable retaining member is deformed upon attaching the main body part and the outlet part together, whereby the elastically deformable retaining member retains the main body part and the outlet part together.

13. A method of manufacturing the carbonator of claim 1, the method comprising:

drilling the main conduit section through at least 80% of a length of the carbonator dissolver nozzle; and drilling the ultimate conduit section, the main conduit section having a diameter that is at least four times the diameter of the ultimate conduit section.

* * * * *